United States Patent
Chen et al.

(10) Patent No.: US 11,126,702 B2
(45) Date of Patent: Sep. 21, 2021

(54) APPLICATION LOGIN PASSWORD INPUT METHOD AND APPARATUS, AND TERMINAL

(71) Applicant: Huawei Technologies Co., Ltd., Shenzhen (CN)

(72) Inventors: Yong Chen, Wuhan (CN); Tao Zheng, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 154 days.

(21) Appl. No.: 16/072,107

(22) PCT Filed: Jan. 22, 2016

(86) PCT No.: PCT/CN2016/071786
§ 371 (c)(1),
(2) Date: Jul. 23, 2018

(87) PCT Pub. No.: WO2017/124444
PCT Pub. Date: Jul. 27, 2017

(65) Prior Publication Data
US 2019/0073459 A1   Mar. 7, 2019

(51) Int. Cl.
*H04L 29/06* (2006.01)
*G06F 21/32* (2013.01)
(Continued)

(52) U.S. Cl.
CPC .............. *G06F 21/32* (2013.01); *G06F 21/31* (2013.01); *G06F 21/40* (2013.01); *G06F 21/45* (2013.01);
(Continued)

(58) Field of Classification Search
CPC .......... G06F 21/31; G06F 21/32; G06F 21/40; G06F 21/45; G06F 2221/2141; G06K 9/00892; H04L 63/083; H04L 63/0861
See application file for complete search history.

(56) References Cited

U.S. PATENT DOCUMENTS

2009/0133117 A1   5/2009  Bentley et al.
2013/0246270 A1   9/2013  Du et al.
(Continued)

FOREIGN PATENT DOCUMENTS

CN   103390123 A   11/2013
CN   103606047 A   2/2014
(Continued)

OTHER PUBLICATIONS

Machine Translation and Abstract of Chinese Publication No. CN103390123, Nov. 13, 2013, 14 pages.
(Continued)

*Primary Examiner* — Joseph P Hirl
*Assistant Examiner* — Chi D Nguy
(74) *Attorney, Agent, or Firm* — Conley Rose, P.C.

(57) ABSTRACT

An application login password input method and a terminal, where the method includes, obtaining, by the terminal, biometric feature information of a user, determining, according to the biometric feature information, whether the user has login permission, obtaining voice information of the user, determining, according to the voice information after it is determined that the user has the login permission, password information corresponding to the voice information, and inputting the password information into a password input box of the application. Hence, in combination with the biometric feature information of the user, password information input security is ensured, password information input
(Continued)

accuracy can be improved, an operation is easy and convenient, and burdens of the user can be reduced.

20 Claims, 5 Drawing Sheets

(51) Int. Cl.
    *G06F 21/40*     (2013.01)
    *G06F 21/31*     (2013.01)
    *G06F 21/45*     (2013.01)
    *G06K 9/00*     (2006.01)

(52) U.S. Cl.
    CPC ........ G06K 9/00892 (2013.01); H04L 63/083 (2013.01); H04L 63/0861 (2013.01); *G06F 2221/2141* (2013.01)

(56) References Cited

U.S. PATENT DOCUMENTS

| | | | | |
|---|---|---|---|---|
| 2015/0056951 | A1* | 2/2015 | Talwar | H04W 12/0609 455/411 |
| 2016/0246953 | A1* | 8/2016 | Wentzell | G06F 21/32 |

FOREIGN PATENT DOCUMENTS

| | | | |
|---|---|---|---|
| CN | 103902872 A | * | 4/2014 |
| CN | 104331652 A | | 2/2015 |
| CN | 104331654 A | | 2/2015 |

OTHER PUBLICATIONS

Machine Translation and Abstract of Chinese Publication No. CN103606047, Feb. 26, 2014, 8 pages.
Machine Translation and Abstract of Chinese Publication No. CN104331652, Feb. 4, 2015, 12 pages.
Machine Translation and Abstract of Chinese Publication No. CN104331654, Feb. 4, 2015, 31 pages.
Foreign Communication From a Counterpart Application, PCT Application No. PCT/CN2016/071786, English Translation of International Search Report dated Oct. 24, 2016, 2 pages.
Foreign Communication From a Counterpart Application, PCT Application No. PCT/CN2016/071786, English Translation of Written Opinion dated Oct. 24, 2016, 7 pages.
Foreign Communication From a Counterpart Application, European Application No. 16885717.5, Extended European Search Report dated Nov. 15, 2018, 7 pages.

\* cited by examiner

APPLICATION LOGIN PASSWORD INPUT METHOD AND APPARATUS, AND TERMINAL

CROSS-REFERENCE TO RELATED APPLICATION

This application is a U.S. National Stage of International Patent Application No. PCT/CN2016/071786 filed on Jan. 22, 2016, which is hereby incorporated by reference in its entirety.

TECHNICAL FIELD

The present invention relates to the terminal field, and in particular, to an application login password input method and apparatus, and a terminal in the terminal field.

BACKGROUND

With increasing popularity of network technologies, networks have permeated into people's work and life, and a large quantity of applications, such as QQ, WeChat, and Tmall, come into being accordingly. To ensure information security of a user, various applications usually need to perform authentication on use permission of the user, and the applications can be used for social and entertaining activities only after authentication succeeds.

A conventional authentication manner is to use a password to manage use permission of a user. However, in a network environment, various types of spyware programs (for example, a Trojan horse program) are rampant, and simple passwords are easily thieved. This greatly threatens privacy and property security of the user. Therefore, the user usually uses a long complex password character string, including a letter, a number, a special symbol, or the like, for encryption. Correspondingly, the user needs to set different passwords for different applications. For example, the user may have a QQ account and password, a WeChat account and password, and an Alipay account and password. The user needs to remember different passwords for different accounts. This brings heavy burdens to the user, and there is a relatively high probability of inputting a wrong password by the user because the password is excessively long.

SUMMARY

In view of this, the present invention provides an application login password input method and apparatus, and a terminal, so as to reduce a probability of inputting wrong password information.

According to a first aspect, an application login password input method is provided, where the method includes: obtaining biometric feature information of a user; determining, according to the biometric feature information, whether the user has login permission; obtaining voice information of the user; determining, according to the voice information after it is determined that the user has the login permission, password information corresponding to the voice information; and inputting the password information into a password input box of the application.

The voice information of the user is obtained, and the password information corresponding to the voice information is determined. In combination with the biometric feature information of the user, password information input security is ensured, a probability of inputting wrong password information can be reduced, and an operation is easy and convenient.

With reference to the first aspect, in a first possible implementation of the first aspect, the determining, according to the voice information of the user, the password information corresponding to the voice information includes: obtaining a meaning of the voice information according to the obtained voice information when it is determined that the user has the login permission; and determining, in a voice password database according to the meaning of the voice information, the password information that matches the meaning of the voice information, where the voice password database includes a voice password pair of the user, the voice password pair includes the meaning of the voice information and the password information, and the meaning of the voice information is in a one-to-one correspondence with the password information.

Multiple voice password pairs are prestored, and a meaning of voice information in a voice password pair is in a one-to-one correspondence with password information, so that for subsequent use, a user merely needs to identify, from a prestored voice password database including the multiple voice password pairs, password information corresponding to a meaning of voice information of the user, so as to implement input of various password information.

With reference to the first implementation of the first aspect, in a second possible implementation of the first aspect, the voice password pair further includes the biometric feature information of the user, and both the biometric feature information and the meaning of the voice information are in a one-to-one correspondence with the password information; and the determining, in the voice password database according to the meaning of the voice information when it is determined that the user has the login permission, the password information that matches the meaning of the voice information includes: when it is determined that the user has the login permission, determining, in the voice password database according to the biometric feature information and the meaning of the voice information, the password information that matches both the biometric feature information and the meaning of the voice information.

Multiple voice password pairs are prestored, and both biometric feature information and a meaning of voice information that are in a voice password pair are in a one-to-one correspondence with password information, so that for subsequent use, a user merely needs to identify, from a prestored voice password database including the multiple voice password pairs, password information corresponding to both biometric feature information of the user and a meaning of voice information of the user, so as to implement input of various password information.

The voice password database of the user may be obtained in a voice password recording manner, or may receive a voice password database sent by another terminal device.

In combination with cloud backup or primary backup, this facilitates changing of a terminal device for the user.

Optionally, for the voice password pair, voice of the voice information may be in a one-to-one correspondence with the password information, or both the biometric feature information and voice of the voice information are in a one-to-one correspondence with the password information, and the voice of the voice information includes tone, a syllable, a voice frequency, voice quality, or the like.

Optionally, encryption is performed on the voice password pair by using a trusted character string encryption algorithm, greatly ensuring voice password storage security.

With reference to the first implementation of the first aspect, in a third possible implementation of the first aspect, the method further includes: starting a password setting screen of the application; receiving the meaning of the voice information input by the user and the password information; and saving the meaning of the voice information and the password information to the voice password database, where the meaning of the voice information is in a one-to-one correspondence with the password information.

With reference to the second implementation of the first aspect, in a fourth possible implementation of the first aspect, the method further includes: starting a password setting screen of the application; receiving the meaning of the voice information input by the user, the password information, and the biometric feature information; and saving the meaning of the voice information, the password information, and the biometric feature information to the voice password database, where both the biometric feature information and the meaning of the voice information are in a one-to-one correspondence with the password information.

Optionally, after the password setting screen of the application is started, a manner of performing authentication by using a biometric feature of a user may be further used to ensure voice password database establishment security.

With reference to the first aspect, or any implementation of the first aspect, in a fifth possible implementation of the first aspect, the biometric feature information includes at least one of fingerprint feature information, iris feature information, voiceprint feature information, facial feature information, vein feature information, or retina feature information.

Authentication by using a biometric feature is simple and fast, and also secure, reliable, and accurate for identity affirmation.

With reference to any one of the foregoing implementations of the first aspect, in a sixth possible implementation of the first aspect, the meaning of the voice information and the password information in the voice password pair are different.

The meaning of the voice information and the password information in the voice password pair are set differently, and this avoids a privacy problem in a voice input process.

With reference to the first aspect, or any implementation of the first aspect, in a seventh possible implementation of the first aspect, before the obtaining biometric feature information of a user, the method further includes: generating prompt information, where the prompt information is used to instruct the user to input the biometric feature information and the voice information to complete password input.

According to a second aspect, an application login password input apparatus is provided, and is configured to execute the method in the first aspect or any possible implementation of the first aspect. Specifically, the apparatus includes a unit that executes the method in the first aspect or any possible implementation of the first aspect.

According to a third aspect, a terminal is provided and includes a receiver, a memory, a processor, a sensor, a microphone, and a bus system, where the receiver, the memory, the processor, the sensor, and the microphone are connected by using the bus system; the receiver is configured to receive data; the sensor is configured to obtain biometric feature information; the microphone is configured to obtain voice information of a user; the memory is configured to store an instruction; and the processor is configured to execute the instruction stored in the memory, where the processor executes the instruction stored in the memory, to enable the processor to execute the method in the first aspect or any possible implementation of the first aspect.

According to a fourth aspect, an embodiment of the present invention provides a computer storage medium, configured to store a computer software instruction used in the foregoing method, where the computer storage medium includes a program designed for executing the foregoing aspects.

These and other aspects of the present invention will become more concise and easier to understand in the following descriptions of multiple embodiments.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

Figure 1:
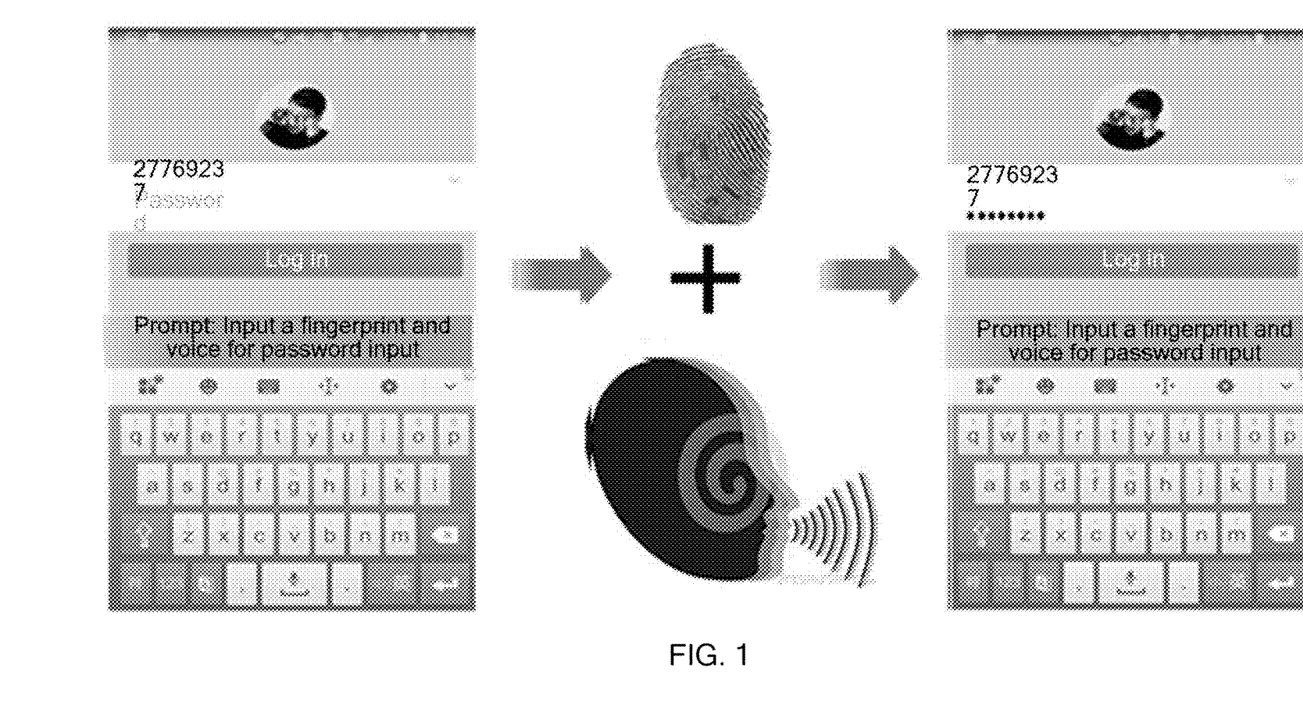
FIG. 1 is a schematic diagram of an application scenario according to an embodiment of the present invention.

FIG. 1 is a schematic diagram of an application scenario according to an embodiment of the present invention. The application scenario includes but is not limited to a scenario in which a password needs to be input for QQ, WeChat, a webpage, an email, or another third-party application. For ease of description, logging in to QQ is used as an example for description in the present invention.

Figure 2:
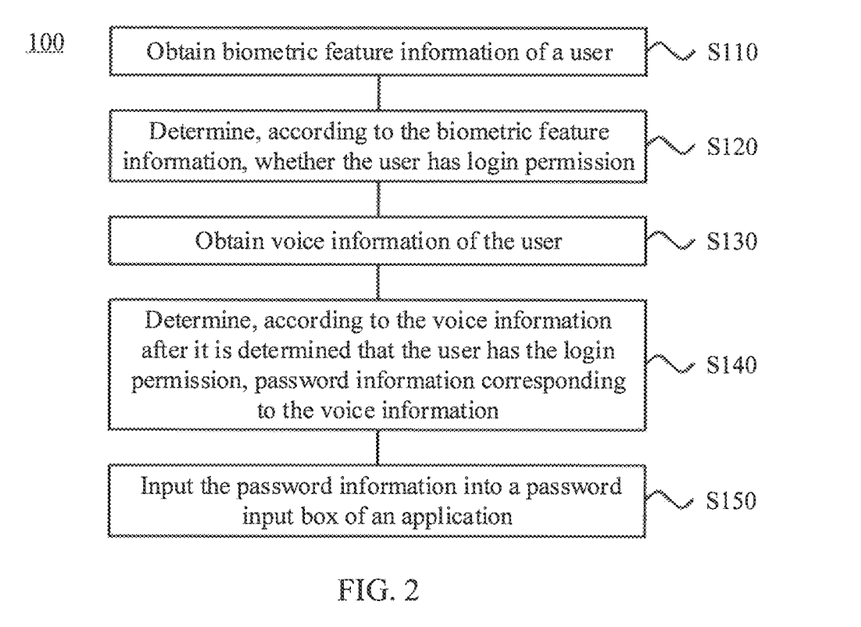
FIG. 2 is a schematic flowchart of an application login password input method according to an embodiment of the present invention.

When needing to log in to QQ, a user starts QQ software on a terminal device. The terminal device invokes an input method control after identifying a password input box on a QQ login screen. There is a prompt, as shown in FIG. 1, on the input method control, and the user may complete a password input operation in a manner of both a fingerprint and voice. FIG. 2 is a schematic flowchart of an application login password input method 100 according to an embodiment of the present invention. As shown in FIG. 2, the method may be executed by a terminal device, for example, by a mobile terminal. The method 100 includes the following steps:

S110. Obtain biometric feature information of a user.

S120. Determine, according to the biometric feature information, whether the user has login permission.

S130. Obtain voice information of the user.

S140. Determine, according to the voice information after it is determined that the user has the login permission, password information corresponding to the voice information.

S150. Input the password information into a password input box of the application.

Specifically, after or when the application is started, the mobile terminal may obtain the biometric feature information of the user by using a biometric feature recognition module such as a fingerprint recognition chip, and determine whether the user has the login permission. The mobile terminal may obtain the voice information of the user when obtaining the biometric feature information, or may obtain the voice information of the user in a period of time after that the user has the login permission is determined. The period of time may be 1 s, 2 s, or another time interval, and may be determined according to a configuration of the mobile terminal. In this way, the mobile terminal may determine, according to the voice information of the user, the password information corresponding to the voice information of the user, and input the password information into the password input box of the application.

Therefore, according to the method in this embodiment of the present invention, the voice information of the user is obtained, and the password information corresponding to the voice information is determined. In combination with the biometric feature information of the user, password information input security is ensured, password information input accuracy can be improved, an operation is easy and convenient, and burdens of the user can be reduced.

Optionally, after determining that the user has the login permission, the mobile terminal may further invoke a decryption algorithm to decrypt the password information corresponding to the voice information, so as to obtain the corresponding password information according to the voice information input by the user.

It should be understood that the determining, according to the biometric feature information, whether the user has login permission in this embodiment of the present invention may be fingerprint recognition and hand geometry recognition that develop relatively maturely in a related technology in the current market, may be facial recognition that has gained immense popularity and that has developed rapidly at present stage, may be multiple types of biometric feature identification technologies such as iris recognition, finger vein recognition, voiceprint recognition, signature recognition, gait recognition, typing rhythm recognition, and desoxyribonucleic acid (Deoxyribonucleic acid, DNA) recognition, or even may be user identity authentication by means of biometric feature fusion or by using a multimodal biometric feature technology in the future.

Preferably, in this embodiment of the present invention, the mobile terminal uses a fingerprint recognition technology to determine whether the user has the login permission. For example, when the user needs to log in to QQ, the mobile terminal determines that the user selects a QQ password input box shown in FIG. 1, and then runs an input method control, so as to prompt the user in a manner of text on the input method control, for example, Input fingerprint and voice information for password input. It should be understood that the prompt may appear on an input method control screen, may appear in a form of a floating element, or even may not appear on a mobile phone screen. The mobile terminal may alternatively prompt the user by means of vibration or voice. This is not limited in the present invention. The mobile terminal obtains fingerprint feature information input by the user by using a fingerprint button, for example, a home Home button of a mobile phone. Simultaneously, the mobile terminal may further obtain the voice information input by the user, or may obtain the voice information of the user after determining that the user inputs the fingerprint feature information. For example, a meaning "QQ password" of the voice information is in a one-to-one correspondence with to a real password "12345678". After determining that the user has the login permission by using a fingerprint recognition chip, the mobile terminal obtains the meaning "QQ password" input by the user; the real password "12345678" corresponding to the voice is determined according to the meaning. After the mobile terminal determines the real password, the password information may be input into the QQ password input box. After determining that the user does not have the login permission by using a fingerprint recognition chip, the mobile terminal may indicate an authentication failure to the user by means of vibration, text, or voice, or in any manner that can be used to prompt the user.

Optionally, whether the user has the login permission may be determined according to voiceprint feature information. For example, after QQ is started, the mobile terminal may obtain voice information of a user, for example, "hello", and the terminal device may perform authentication according to factors such as a syllable, a voice frequency, and voice intensity of "hello". After determining that the user has the login permission, the mobile terminal may continue to obtain the voice information of the user and determine password information corresponding to the voice information. It should be understood that the voice information used for authentication and obtained by the mobile terminal and the voice information used for determining the password information may be the same or different. For example, after authentication is performed by using "hello", QQ password information may be determined according to the voice information "hello" input again or the voice information "hello" used for authentication, where the meaning of the voice information "hello" is in a one-to-one correspondence with the QQ password information.

Figure 3:
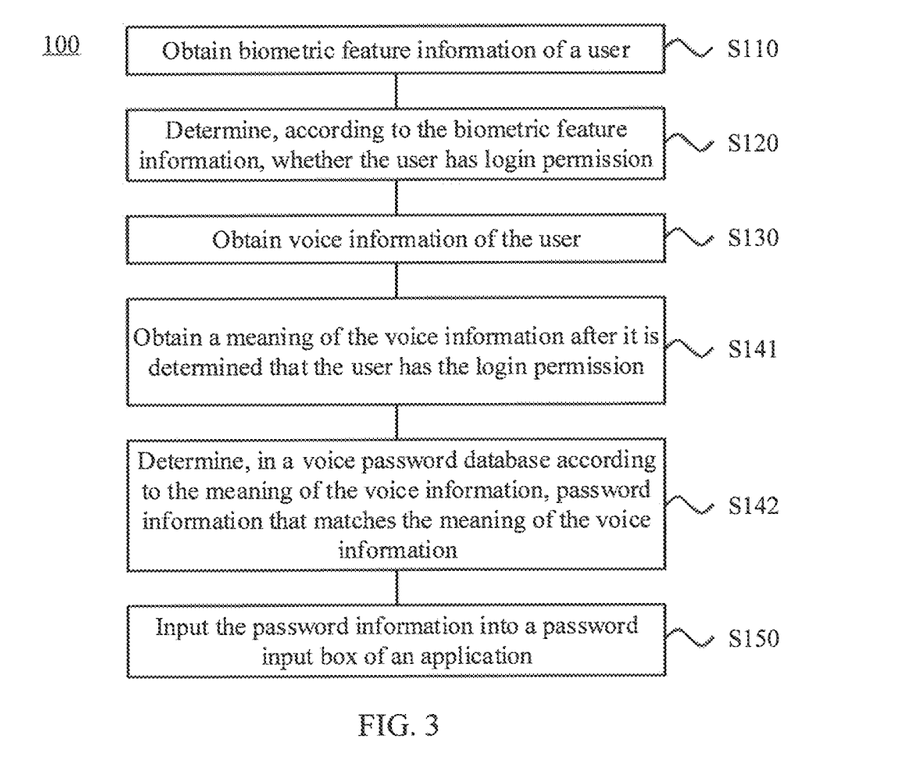
FIG. 3 is another schematic flowchart of an application login password input method according to an embodiment of the present invention.

In this embodiment of the present invention, the mobile terminal may further search a voice password database for password information that matches the voice information input by the user, where the voice password database includes at least voice information and password information that are associated with an application to which the user needs to log in. The following describes, with reference to FIG. 3, another schematic flowchart of an application login password input method 100 according to an embodiment of the present invention. As shown in FIG. 3, the determining, according to the voice information after it is determined that the user has the login permission, password information corresponding to the voice information includes the following steps:

S141. Obtain a meaning of the voice information according to the voice information after it is determined that the user has the login permission.

S142. Determine, in a voice password database according to the meaning of the voice information, password information that matches the meaning of the voice information.

Specifically, before obtaining the biometric feature information of the user, the mobile terminal may first obtain a voice password database including a voice password pair of the user. The voice password database includes at least a voice password pair associated with an application to which the user needs to log in. For example, when user A uses a mobile phone to log in to QQ, the voice password database includes at least a voice password pair for logging in to QQ by user A.

Optionally, the voice password pair includes a meaning of voice information and password information. The mobile terminal first obtains the meaning of the voice information according to a voice recognition algorithm when determining that the user has login permission, and then determines, according to the meaning of the voice information, password information corresponding to the meaning of the voice information. A voice password pair storage manner may be shown in Table 1.

TABLE 1

Voice password pair storage manner 1

| Meaning of voice information | Real password |
|---|---|
| QQ password | 12345678abc? |
| WeChat password | 87654321abc? |
| Alipay password | Z87654321abc? |
| JD password | J123456abc? |

As shown in Table 1, when the mobile terminal identifies that the "QQ password" is input by the user, the real password "12345678abc?" corresponding to the "QQ password" may be determined in the voice password database; when the mobile terminal identifies that the "WeChat password" is input by the user, the real password "87654321abc?" corresponding to the "WeChat password" may be determined in the voice password database; when the mobile terminal identifies that the "Alipay password" is input by the user, the real password "Z87654321abc?" corresponding to the "Alipay password" may be determined in the voice password database; when the mobile terminal identifies that the "JD password" is input by the user, the real password "J123456abc?" corresponding to the "JD password" may be determined in the voice password database.

It should be understood that the voice password database may be established in a terminal device, or may be received from a voice password database sent by another terminal device. For example, the voice password database may be recorded by adding a new entry to a security setting of a mobile phone; after establishment of voice password data in the mobile phone is completed, the mobile phone may send the voice password database to a computer by means of Bluetooth or the like when the user needs to log in to a same application on the computer, so that the user may perform an operation without recording the voice password database again on the computer.

It should be understood that the meaning of the voice information and the password information that are in the voice password pair may be the same or may be different. Preferably, the meaning of the voice information and the password are different, so as to ensure password input security for a user.

The voice password pair may be further encrypted by using a trusted character string encryption algorithm. The encryption algorithm includes the Data Encryption Standard (Data Encryption Standard, DES), the Digital Signature Algorithm (Digital Signature Algorithm, DSA), the Advanced Encryption Standard (Advanced Encryption Standard, AES), and other encryption algorithms. This greatly ensures voice password storage security.

Optionally, the voice password pair further includes the biometric feature information, where both the biometric feature information and the meaning of the voice information are in a one-to-one correspondence with the password information.

The determining, in a voice password database according to the meaning of the voice information, password information that matches the meaning of the voice information includes determining, in the voice password database according to the biometric feature information and the meaning of the voice information, the password information that matches both the biometric feature information and the meaning of the voice information.

A voice password pair storage manner may be shown in Table 2.

TABLE 2

Voice password pair storage manner 2

| Associated fingerprint | Meaning of voice information | Real password |
|---|---|---|
| Fingerprint 1 | QQ password | 12345678abc? |
| Fingerprint 2 | WeChat password | 87654321abc? |
| Fingerprint 2 | Alipay password | Z87654321abc? |
| Fingerprint 1 | JD password | J123456abc? |

As shown in Table 2, when the mobile terminal obtains the fingerprint 1, and the mobile terminal identifies that the "QQ password" is input by the user, the real password "12345678abc?" corresponding to the fingerprint 1 and the "QQ password" may be determined in the voice password database; when the mobile terminal obtains the fingerprint 2, and the mobile terminal identifies that the "WeChat password" is input by the user, the real password "87654321abc?" corresponding to the fingerprint 2 and the "WeChat password" may be determined in the voice password database; when the mobile terminal obtains the fingerprint 2, and the mobile terminal identifies that the "Alipay password" is input by the user, the real password "Z87654321abc?" corresponding to the fingerprint 2 and the "Alipay password" may be determined in the voice password database; when the mobile terminal obtains the fingerprint 1, and the mobile terminal identifies that the "JD password" is input by the user, the real password "J123456abc?" corresponding to the fingerprint 1 and the "JD password" may be determined in the voice password database.

It should be understood that for the voice password pair in the voice password database, the meaning of the voice information may be in a one-to-one correspondence with the password information or both the biometric feature information and the meaning of the voice information are in a one-to-one correspondence with the password information, or voice of the voice information is in a one-to-one correspondence with the password information, or both the biometric feature information and voice of the voice information are in a one-to-one correspondence with the password information. For example, the mobile terminal may identify the meaning "QQ password" of voice according to the voice "QQ password" input by a user, and determine the password "12345678" corresponding to the meaning "QQ password", or may determine, according to the voice input by the user, the password "12345678" corresponding to the voice, where the voice may include tone, a syllable, voice quality, a voice frequency, or the like of the user. Preferably, the voice information in the voice password pair is the meaning of the voice information.

Therefore, according to the method in this embodiment of the present invention, multiple voice password pairs are prestored, and a meaning of voice information in a voice password pair is in a one-to-one correspondence with password information, or both biometric feature information and a meaning of voice information that are in a voice password pair are in one-to-one correspondence with password information, so that for subsequent use, a user merely needs to identify, from a prestored voice password database including the multiple voice password pairs, password information corresponding to a meaning of voice information of the user or password information corresponding to both biometric feature information of the user and a meaning of voice information of the user, so as to implement input of various password information. In addition, in combination with cloud backup or primary backup, this facilitates changing of a terminal device for the user.

Optionally, the method 100 further includes: starting a password setting screen of the application; receiving the meaning of the voice information input by the user and the password information; and saving the meaning of the voice information and the password information to the voice password database, where the meaning of the voice information is in a one-to-one correspondence with the password information.

Optionally, the method 100 further includes: starting a password setting screen of the application; receiving the biometric feature information input by the user, the meaning of the voice information, and the password information; and saving the biometric feature information, the meaning of the voice information, and the password information to the voice password database, where both the biometric feature information and the meaning of the voice information are in a one-to-one correspondence with the password information.

Optionally, after the password setting screen of the application is started, the biometric feature information of the user may be obtained; whether the user has operation permission is determined according to the biometric feature information; and after it is determined that the user has the operation permission, voice of voice information input by the user and password information are received.

After it is determined that the user has the operation permission, biometric feature information used by the user for authentication, the input meaning of the voice information, and the password information are bound together, that is, the biometric feature information is used to associate the meaning of the voice information with the password information, so as to form a matched voice password pair and perform secure storage.

It should be understood that the biometric feature information of the user may be obtained again after it is determined that the user has the operation permission. The biometric feature information may be the same as or different from the input biometric feature information used for authentication.

A manner of performing authentication by using a biometric feature ensures voice password database establishment security.

Optionally, a manner that biometric feature information and voice password are bound is selected according to a terminal device type. For example, fingerprint feature information of a user and a meaning of voice information input by the user are bound to password information when voice password pairs for various applications are established on a terminal device such as a mobile phone or a pad. Facial feature information of a user, gait feature information of the user, and a meaning of voice information input by the user are bound to password information when voice password pairs for various applications are established on a terminal device such as an intelligent television or a large game console.

Figure 4:
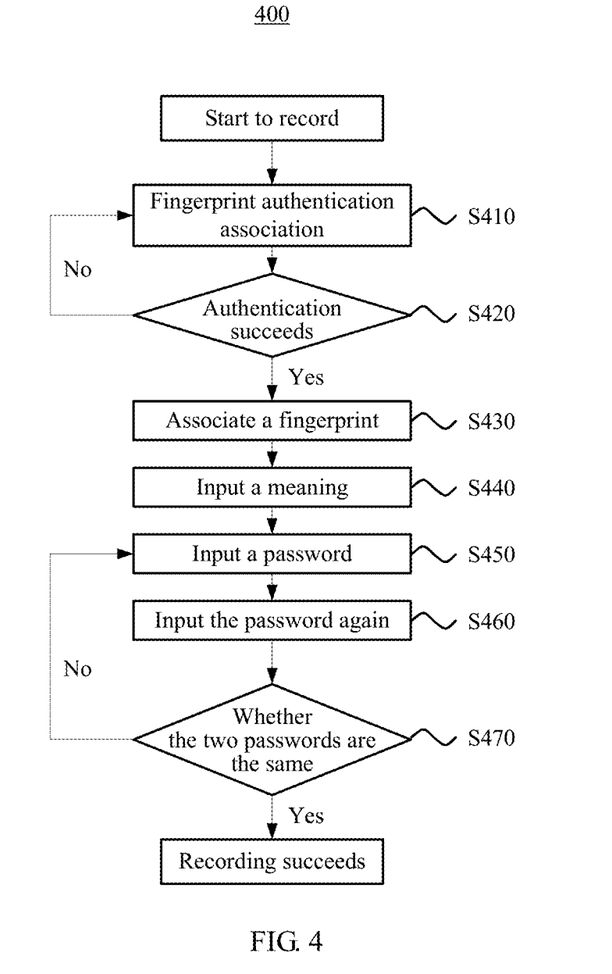
FIG. 4 is a schematic flowchart of a voice password database establishment method according to an embodiment of the present invention.

The following describes in detail a specific embodiment of a voice password database establishment method 400 in an embodiment of the present invention with reference to FIG. 4. As shown in FIG. 4, the method 400 includes the following steps:

S410. Obtain fingerprint feature information of a user.

S420. Perform authentication on an identity of the user according to the fingerprint feature information; and if authentication succeeds, perform step S430, or if authentication fails, go back to step S410 to obtain the fingerprint feature information of the user.

S430. After the authentication of the user succeeds, the fingerprint feature information of the user may be input again; or may not be input, and the fingerprint feature information obtained in step S410, a meaning of voice information that is input in step S440, and password information input in step S450 are directly bound, that is, the fingerprint feature information is used to associate the meaning of the voice information with the password information, so as to form a matched voice password pair and perform secure storage.

S440. Input a meaning of voice information of the user, for example, "QQ password".

S450. Input password information, for example, "12345678abc?".

S460. Input password information again.

S470. Determine whether the two passwords input in step S450 and step S460 are the same, and if the two passwords are the same, the voice password database is established successfully, or if the two passwords are different, go back to step S450 to input a real password again.

It should be understood that the meaning of the voice information that is input in step S440 and the password information input in step S450 may be the same or different. Preferably, the meaning of the voice information and the password are different, so as to ensure password input security for a user.

It should be understood that, sequence numbers of the foregoing processes do not mean an execution sequence. The execution sequence of the processes should be determined according to functions and internal logic of the processes, and should not be construed as any limitation on the implementation processes of the embodiments of the present invention.

Although the present invention and advantages of the present invention have been described in detail, it should be understood that various variations, replacements, and modifications to the present invention may be made without departing from the spirit and scope of the present invention defined by the following claims.

Figure 5:
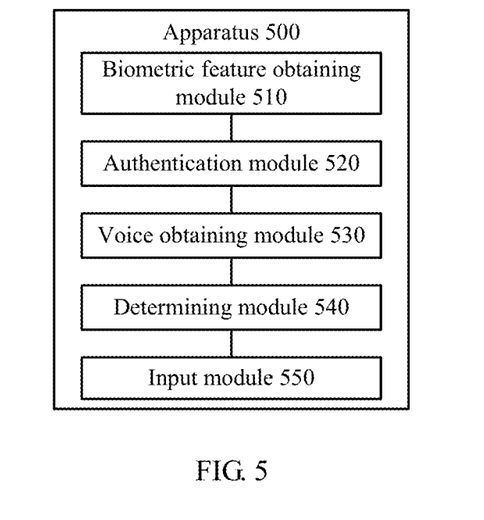
FIG. 5 is a schematic flowchart of an application login password input apparatus according to an embodiment of the present invention.

FIG. 5 is a schematic block diagram of an application login password input apparatus 500 according to an embodiment of the present invention. As shown in FIG. 5, the apparatus 500 includes:

a biometric feature obtaining module 510, configured to obtain biometric feature information of a user;

an authentication module 520, configured to determine, according to the biometric feature information obtained by the biometric feature obtaining module 510, whether the user has login permission;

a voice obtaining module 530, configured to obtain voice information of the user;

a determining module 540, configured to: when the authentication module 520 determines that the user has the login permission, determine, according to the voice information obtained by the voice obtaining module 530, password information corresponding to the voice information; and an input module 550, configured to input the password information determined by the determining module 540 into a password input box of the application.

Therefore, according to the apparatus in this embodiment of the present invention, the voice information of the user is obtained, and the password information corresponding to the voice information is determined. In combination with the biometric feature information of the user, password information input security is ensured, password information input accuracy can be improved, an operation is easy and convenient, and burdens of the user can be reduced.

It should be understood that in this embodiment of the present invention, the biometric feature obtaining module 510 and the authentication module 520 may be a fingerprint recognition chip and a facial recognition chip on hardware, or may be multiple types of biometric recognition chips such as an iris recognition chip, a voiceprint recognition chip, and a finger vein recognition chip.

Optionally, the apparatus provided in this embodiment of the present invention is a terminal device, and includes but is not limited to a mobile phone, a computer, a multimedia machine, or a game console.

The application login password input apparatus 500 in this embodiment of the present invention may be corresponding to the mobile terminal in the foregoing embodiment of the present invention, and the foregoing and other operations and/or functions of modules of the apparatus 500 are respectively used for implementing corresponding procedures of the methods 100 in FIG. 2 to FIG. 4. For brevity, details are not repeated herein.

Figure 6:
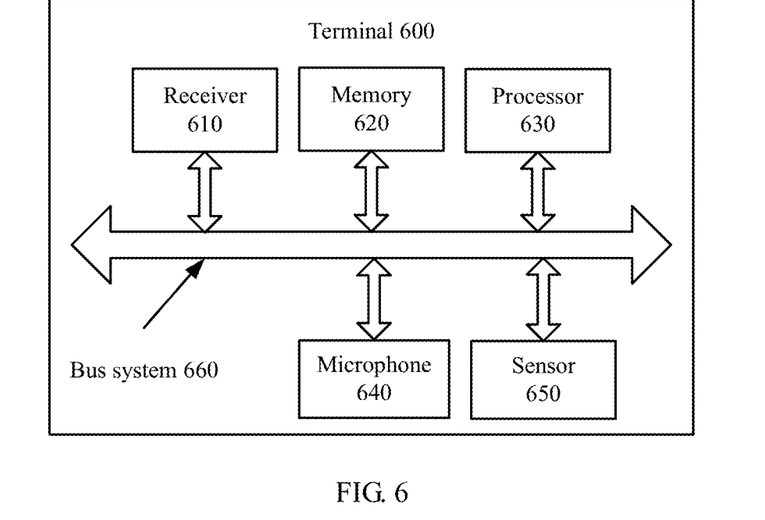
FIG. 6 is a schematic flowchart of a terminal according to an embodiment of the present invention.

FIG. 6 shows a terminal 600 according to an embodiment of the present invention. The terminal 600 includes a receiver 610, a memory 620, a processor 630, a microphone 640, a sensor 650, and a bus system 660. The receiver 610, the memory 620, the processor 630, the microphone 640, and the sensor 650 are connected by using the bus system 660. The receiver 610 is configured to receive data. The memory 620 is configured to store an instruction. The processor 630 is configured to execute the instruction stored in the memory. The sensor 650 is configured to obtain biometric feature information of a user. The microphone 640 is configured to obtain voice information of the user.

The processor is configured to: determine, according to the biometric feature information obtained by the sensor, whether the user has login permission; when it is determined that the user has the login permission, determine, according to the voice information obtained by the microphone, password information corresponding to the voice information; and input the password information into a password input box of the application.

Therefore, according to the terminal in this embodiment of the present invention, the voice information of the user is obtained, and the password information corresponding to the voice information is determined. In combination with the biometric feature information of the user, password information input security is ensured, password information input accuracy can be improved, an operation is easy and convenient, and burdens of the user can be reduced.

It should be understood that in this embodiment of the present invention, the processor 630 may be a central processing unit (Central Processing Unit, "CPU" for short), or the processor 630 may be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor, or the processor may be any conventional processor or the like.

The microphone 640 may include a ribbon microphone, a moving-coil microphone, and a condenser microphone and an electret microphone that are widely used currently.

The sensor 650 may be a fingerprint sensor, a facial recognition camera, a finger vein authentication sensor, an iris recognition sensor, a voiceprint recognition sensor, or the like, or may be another sensor that can be used for authentication.

In addition to including a data bus, the bus system 660 may further include a power bus, a control bus, a status signal bus, or the like. However, for clear description, all kinds of buses are marked as the bus system 660 in the figure.

In an implementation process, all steps of the foregoing method may be completed by using an integrated logic circuit of hardware in the processor 630 or by using an instruction in a software form. The steps of the method disclosed with reference to this embodiment of the present invention may be executed and completed by a hardware processor, or may be executed and completed by using a combination of hardware and software modules in the processor. The software module may be located in a storage medium mature in the art such as a random memory, a flash memory, a read-only memory, a programmable read-only memory, an electrically erasable programmable memory, or a register. The storage medium is located in the memory 620. The processor 630 reads the information from the memory 620, and completes the steps of the foregoing method with reference to hardware of the processor 630. To avoid repetition, details are not repeated herein.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for ease and brevity of description, for a detailed working process of the foregoing system, apparatus, and unit, reference may be made to a corresponding process in the foregoing method embodiments, and details are not repeated herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some characteristics may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, a network device, or the like) to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An application login password input method, comprising:
    opening an application having a password input box in response to a user operation;
    obtaining biometric feature information of a user;
    determining, according to the biometric feature information, whether the user has login permission;
    obtaining voice information of the user;
    obtaining a meaning of the voice information according to the voice information after the user has the login permission;
    determining, in a voice password database, password information matching the meaning of the voice information, wherein the voice password database comprises a voice password pair of the user, wherein the voice password pair comprises both the biometric feature information and the meaning of the voice information comprising a one-to-one correspondence with the password information, wherein the biometric feature information is obtained from a first biometric source of the user, wherein the meaning of the voice information is obtained from a second biometric source of the user, and wherein the first biometric source and the second biometric source comprise different types of biometric information; and
    inputting the password information into the password input box of the application.

2. The application login password input method of claim 1, wherein determining the password information matching the meaning of the voice information comprises determining, in the voice password database according to the biometric feature information and the meaning of the voice information, the password information matching the biometric feature information and the meaning of the voice information.

3. The application login password input method of claim 2, further comprising:
    starting a password setting screen of the application;
    receiving the meaning of the voice information from the user, the password information, and the biometric feature information; and
    storing the meaning of the voice information, the password information, and the biometric feature information to the voice password database, wherein both the biometric feature information and the meaning of the voice information comprise a one-to-one correspondence with the password information.

4. The application login password input method of claim 2, wherein the meaning of the voice information and the password information in the voice password pair are different.

5. The application login password input method of claim 2, wherein before obtaining the biometric feature information of the user, the application login password input method further comprises generating prompt information, and wherein the prompt information instructs the user to input the biometric feature information and the voice information to complete password input.

6. The application login password input method of claim 1, further comprising:
    starting a password setting screen of the application;
    receiving the meaning of the voice information from the user and the password information; and
    storing the meaning of the voice information and the password information to the voice password database, wherein the meaning of the voice information comprises a one-to-one correspondence with the password information.

7. The application login password input method of claim 1, wherein the biometric feature information comprises at least one of fingerprint feature information, iris feature information, facial feature information, voiceprint feature information, vein feature information, or retina feature information.

8. The application login password input method of claim 1, wherein the meaning of the voice information and the password information in the voice password pair are different.

9. The application login password input method of claim 1, wherein before obtaining the biometric feature information of the user, the application login password input method further comprises generating prompt information, and wherein the prompt information instructs the user to input the biometric feature information and the voice information to complete password input.

10. The application login password input method of claim 1, wherein before obtaining the biometric feature information of the user, the application login password input method further comprises generating prompt information, and wherein the prompt information instructs the user to input the biometric feature information and the voice information to complete password input.

11. The application login password input method of claim 1, further comprising displaying a log in user interface, wherein the log in user interface comprises the password input box, a log in button, and a visual prompt indicating to input a first sample from the first biometric source and a second sample form the second biometric source.

12. The application login password input method of claim 11, wherein the first biometric source comprises a fingerprint, and wherein the second biometric source comprises a voice input.

13. The application login password input method of claim 1, further comprising performing voice recognition on the voice information of the user to obtain the meaning of the voice information.

14. A terminal, comprising:
a sensor configured to obtain biometric feature information of a user;
a microphone coupled to the sensor and configured to obtain voice information of the user;
a memory coupled to the sensor and the microphone and configured to store an instruction; and
a processor coupled to the sensor, the microphone, and the memory, wherein the instruction stored in the memory causes the processor to be configured to:
open an application having a password input box in response to a user operation;
determine, according to the biometric feature information obtained by the sensor, whether the user has login permission;
obtain a meaning of the voice information according to the voice information after the user has the login permission;
determine, in a voice password database, password information matching the meaning of the voice information after the user has the login permission, wherein the voice password database comprises a voice password pair of the user, wherein the voice password pair comprises both the biometric feature information and the meaning of the voice information comprising a one-to-one correspondence with the password information, wherein the biometric feature information is obtained from a first biometric source of the user, wherein the meaning of the voice information is obtained from a second biometric source of the user, and wherein the first biometric source and the second biometric source comprise different types of biometric information; and
input the password information into the password input box of the application.

15. The terminal of claim 14, wherein the instruction further causes the processor to be configured to determine, in the voice password database according to the biometric feature information and the meaning of the voice information, the password information matching the biometric feature information and the meaning of the voice information.

16. The terminal of claim 15, wherein the instruction further causes the processor to be configured to:
start a password setting screen of the application;
receive the meaning of the voice information from the user, the password information, and the biometric feature information; and
store the biometric feature information, the meaning of the voice information, and the password information to the voice password database, wherein both the biometric feature information and the meaning of the voice information comprise a one-to-one correspondence with the password information.

17. The terminal of claim 15, wherein the meaning of the voice information and the password information in the voice password pair are different.

18. The terminal of claim 14, wherein the instruction further causes the processor to be configured to:
start a password setting screen of the application;
receive the meaning of the voice information from the user and the password information; and
store the meaning of the voice information and the password information to the voice password database, wherein the meaning of the voice information comprises a one-to-one correspondence with the password information.

19. The terminal of claim 18, wherein the meaning of the voice information and the password information in the voice password pair are different.

20. The terminal of claim 14, wherein the meaning of the voice information and the password information in the voice password pair are different.

* * * * *